United States Patent [19]

Jackson

[11] 4,004,965
[45] Jan. 25, 1977

[54] VERTICAL FLAMELESS REBOILER FOR RECONCENTRATING LIQUID DESICCANT

[75] Inventor: Morden A. Jackson, Tulsa, Okla.

[73] Assignee: Maloney-Crawford Tank Corporation, Tulsa, Okla.

[22] Filed: May 24, 1976

[21] Appl. No.: 689,638

Related U.S. Application Data

[63] Continuation-in-part of Ser. No. 216,831, Jan. 10, 1972, Pat. No. 3,975,229.

[52] U.S. Cl. .......................... 159/27 R; 199/28 R; 199/31; 122/7 R; 55/32
[51] Int. Cl.[2] .................... B01D 1/00; F22D 1/00; B01D 53/02
[58] Field of Search .................. 159/14, 27, 28, 31, 159/17 VS, 29; 55/32; 62/496, 497; 122/7, 273, 367 C, 327, 343

[56] References Cited

UNITED STATES PATENTS

| 497,432 | 5/1793 | Seabury | 122/273 |
|---|---|---|---|
| 1,067,010 | 7/1913 | Dunn | 159/27 R |
| 2,216,815 | 10/1940 | Hall | 159/17 VS |
| 2,365,305 | 12/1944 | Stromquist | 122/7 R |
| 2,650,802 | 9/1953 | Huet | 122/367 C |
| 3,147,742 | 9/1964 | May | 122/7 |
| 3,269,360 | 8/1966 | Adam | 122/412 |
| 3,351,537 | 11/1967 | Peterson | 202/172 |
| 3,372,677 | 3/1968 | Boyen | 122/7 |
| 3,397,731 | 8/1968 | Gravis | 159/16 R |
| 3,975,229 | 8/1976 | Jackson | 159/31 |

FOREIGN PATENTS OR APPLICATIONS

| 1,303,016 | 7/1962 | France | 122/343 |
|---|---|---|---|

Primary Examiner—Hiram H. Bernstein
Attorney, Agent, or Firm—Head, Johnson, Chafin

[57] ABSTRACT

An apparatus for flamelessly reconcentrating liquid desiccant including vertically disposed upper and lower enclosed reboiler chambers having an enclosed heating section interposed therebetween. Water-rich liquid desiccant is continuously recirculated between the upper and lower reboiler drums through riser conduits disposed within the heating section and return conduits exterior thereof. Simultaneously with the recirculation of the water-rich liquid desiccant an exhaust gas stream from a prime mover is passed through the heating section to convectionally heat the liquid desiccant within the riser conduits causing disengagement of water vapors therefrom. The upper drum includes an outlet for the disengaged water vapors and also an outlet for the resultant water-lean liquid desiccant.

6 Claims, 2 Drawing Figures

VERTICAL FLAMELESS REBOILER FOR RECONCENTRATING LIQUID DESICCANT

CROSS-REFERENCE

This is a continuation-in-part application from co-pending U.S. Pat. application Ser. No. 216,831, filed Jan. 10, 1972 for Flameless Reboiler for Reconcentrating Liquid Desiccant and now U.S. Pat. No. 3,975,229.

BACKGROUND OF THE INVENTION

Liquid desiccants such as diethylene glycol or triethylene glycol, which may be subsequently referred to simply as glycol, have been widely accepted and are presently being used for dehydrating natural gas streams. The dehydration occurs by the intimate mixing of the gas stream with the liquid desiccant and the removal of water from the gas stream because of the greater affinity of water for the glycol than the gas stream.

The resultant moisture laden or water-rich glycol then must be dehydrated itself. Presently this dehydration of the glycol is accomplished by heating or reboiling the liquid above its boiling point so that the water is driven off and water-lean glycol is collected to be recycled to the contact zone of the natural gas stream.

A fire tube having an open flame is usually utilized to heat the water-laden glycol. In many situations the use of an open flame presents a problem due to the fire danger inherent to the use thereof. One situation occurs on off-shore platforms which are many miles from any fire fighting equipment and hence requires that all fire hazards be reduced to a minimum.

Space on off-shore platforms comes at a premium. Therefore, the normally used reboiler systems which are in the form of vertically stacked elongated horizontal drums very often take up too much floor space.

Most gas gathering systems, have included therein internal combustion type prime movers such as piston driven engines or gas fired turbines which utilize hydrocarbon fluids as fuel. All of these engines produce fairly high temperature exhaust gases, usually in the range from 700° to 1300° F. which when exhausted directly to atmosphere represent the loss of amount of recoverable energy in the form of heat. Such losses have heretofore been considered to be largely unavoidable and in only isolated instances have efforts been extended to recover this energy.

It is therefore an object of this invention to present a method and apparatus for flamelessly reconcentrating liquid desiccant through utilization of heat energy produced by an exhaust gas stream emanating from a prime mover and to perform these functions in a vertically disposed unit having reduced floor space.

SUMMARY OF THE INVENTION

Liquid desiccant is continually recirculated between enclosed upper and lower reboiler chambers through riser and return conduits. The riser conduits are disposed within an enclosed heating section through which a stream of hot exhaust gases passes to convectionally heat the liquid desiccant within the riser conduits. Water vapor disengaged by the heating is removed through an outlet in the upper drum and the resultant water-lean desiccant is removed therefrom through a second outlet.

It is also a feature of the present invention to construct the reboiler systems within the confines of a vertically disposed vessel. This requires the rich glycol inlet to be located in the near proximity of the lean-glycol outlet. Hence, instead of compartmentalizing the upper reboiler as with the prior art, receiving tray means is included to receive and divert the rich-glycol to the lower reboiler chamber.

DETAILED DESCRIPTION OF THE PREFERRED EMBODIMENT

Figure 1:
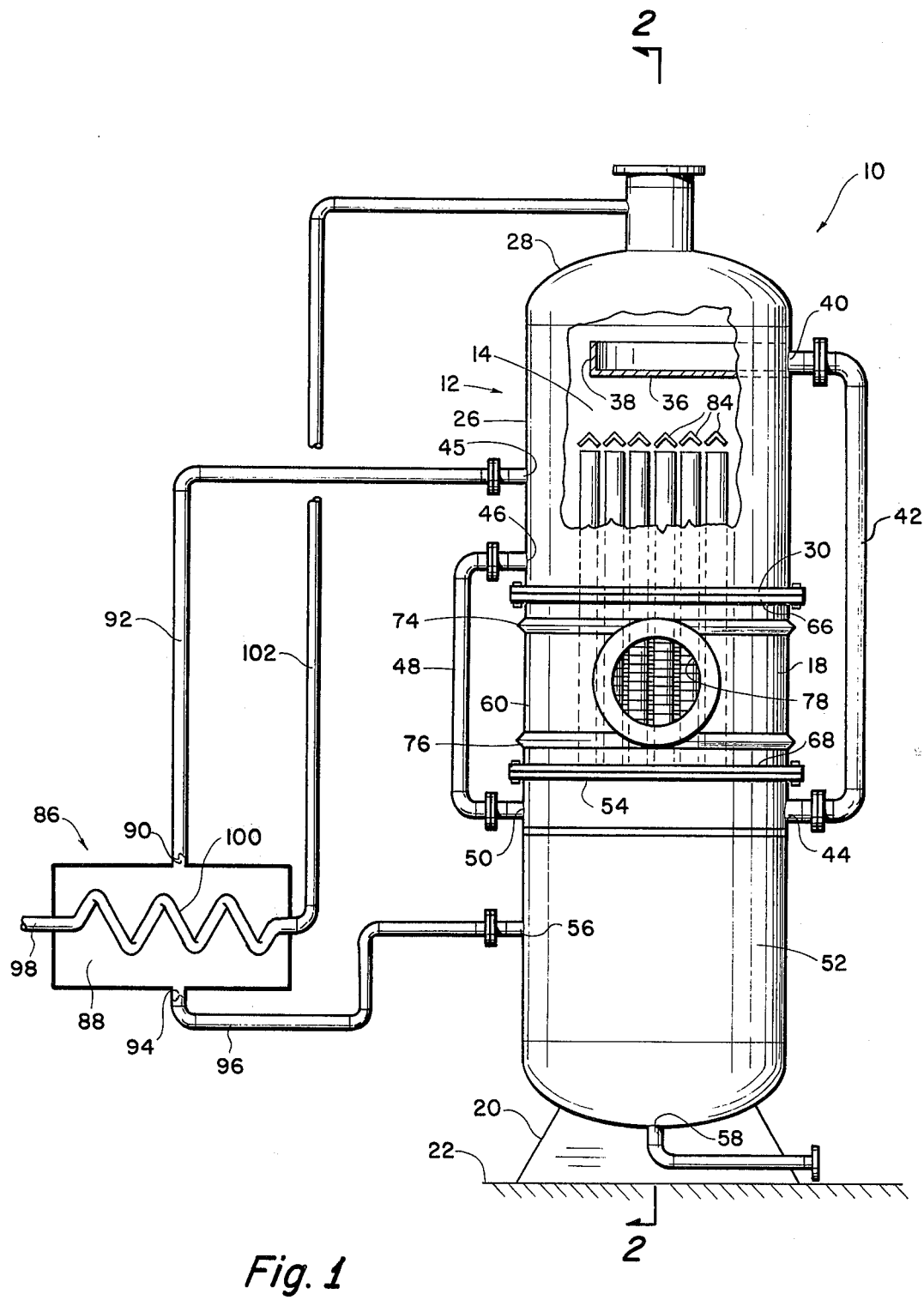
FIG. 1 is a side view of the apparatus of the invention.
Figure 2:
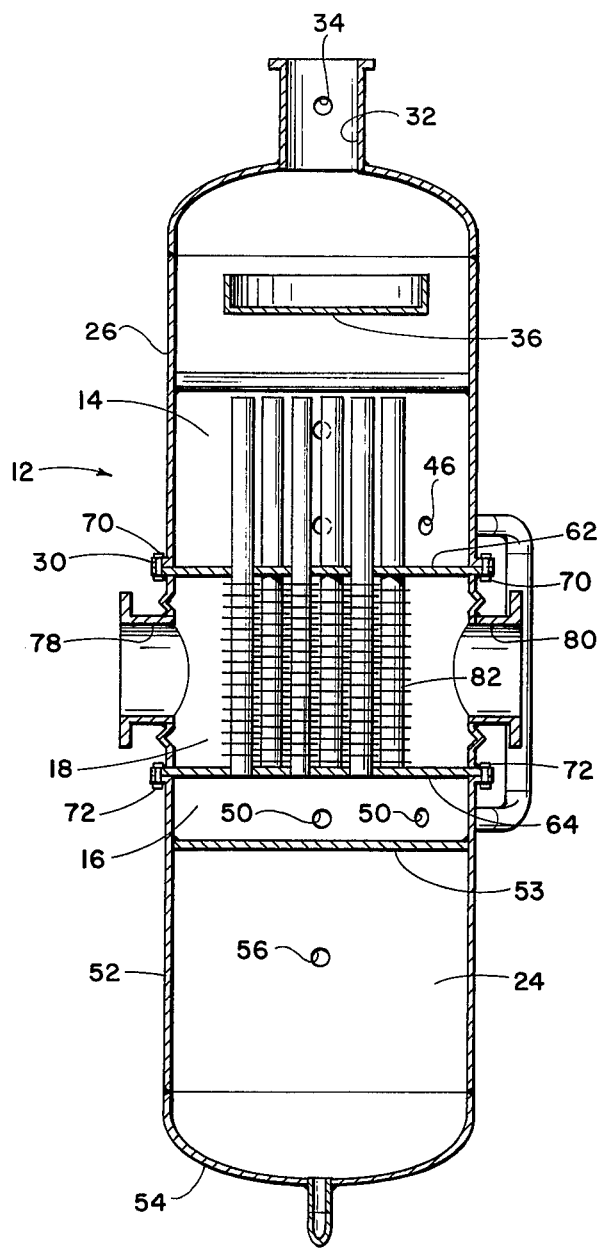
FIG. 2 is a cross-sectional view of the apparatus taken along line 2—2 of FIG. 1.

Referring to the drawings, the reconcentration system 10 of this invention comprises an elongated vertically disposed enclosed vessel 12 having three main sections, an upper reboiler chamber 14, a lower reboiler chamber 16, and an enclosed heating section 18 disposed therebetween.

The vessel 12 is mounted on a suitable sled or mounting apparatus 20 which is in turn positioned on a platform or other suitable means 22. The lower end of the vessel 12 also comprises a third enclosed compartment 24 which serves as a holding tank or surge tank for processed water-lean-desiccant as hereinafter described.

The upper reboiler chamber 14 comprises a cylindrical housing 26 enclosed at the upper end thereof by a dome or end plate 28 and is provided at the lower end thereof with a suitable flange 30. The dome 28 is provided with a centrally disposed vapor outlet port 32 which is normally connected to the lower end of the distillation column or the like (not shown). As a part of the vapor outlet 32, there is a water-rich-desiccant inlet 34 which will be hereinafter more fully described.

A horizontally disposed rich-desiccant receiving tray 36 is disposed within the upper chamber 14 directly below the rich-desiccant inlet 34. The tray 36 is provided with sidewalls 38 for retaining the rich desiccant and a rich desiccant outlet port 40 extending through the upper housing 26 and connected to a downcomer 42 disposed outside the vessel 12. The lower end of the downcomer 42 is connected in open communication with the lower reboiler chamber 16 by an inlet port 44. The purpose of the downcomer is to transmit the received rich-desiccant from the receiving tray 36 into the lower reboiler chamber 16.

The upper housing 26 is also provided with a plurality of outlet ports 46 in the lower portion thereof, each being connected to downcomers 48. The lower end of the downcomers 48 are in open communication with the lower reboiler chamber 16 by means of inlet ports 50. The downcomers 48 are for the purpose of recirculating desiccant being processed by the reboiler in a manner that will be hereinafter set forth.

A lean desiccant outlet port 45 is located in the wall of the upper housing 26 and is spaced above the outlets 46 but below the receiving tray 36 for removing reconcentrated desiccant therefrom in a manner hereinafter set forth.

The lower reboiling chamber 16 and surge tank 24 comprises a lower enclosed cylindrical housing 50 closed at the lower end by a dome or end plate 52, the upper end thereof being provided with a flange member 54. The sidewall of the housing 52 is provided with an inlet port 56 for receiving lean desiccant therethrough. The lower central portion of the domed end plate 54 is provided with a lean desiccant outlet port 58 for the removal of the lean desiccant that has been processed by the reboiler. The lower reboiler chamber 16 and the surge tank 24 are separated by means of a divider plate 53.

The heating chamber 18 comprises a cylindrical housing 60 enclosed by end plates 62 and 64 for separating the heating chamber 18 from the upper reboiler chamber 14 and the lower reboiler chamber 16. These plates may be attached to the cylinder section 60 by welding or other similar means and of a suitable diameter to create flange portions 66 and 68 which are joinable with the flanges 30 and 54 of the upper and lower housing 26 and 52, respectively. The flanges 30 and 62 may be attached by a plurality of bolts 70 or other suitable clamping apparatus. The flanges 54 and 68 are likewise secured by a plurality of bolts 72 or suitable clamping mechanisms.

The cylindrical housing 60 is provided with one or more expansion rings 74 and 76 to compensate for high temperatures introduced into the heating section 18. A hot air exhaust inlet 78 is provided through one side of the cylindrical housing 60 and a similar exhaust port 80 is provided through the opposite sides of the housing for the circulation of hot gases through the section 18.

A plurality of finned elongated spaced tubes 82 are vertically disposed within the heating chamber 18 with the lower open ends thereof extending through the bottom end plate 64 into open communication with the lower reboiler chamber 16. The upper open ends of the tubes 82 extend through the top end plate 62 into the upper reboiler chamber 14 whereby the ends thereof extend above the level of the lean desiccant outlet port 45 and below the receiving tray 36.

The plurality of finned tubes 82 will hereinafter be referred to as risers and are for the purpose of percolating or transmitting the liquid desiccant from the lower reboiler chamber 16 into the upper reboiler chamber 14.

A plurality of vapor caps 84 are disposed within the upper reboiler chamber 14 directly over each upper open end of the risers 82. These vapor caps 84 may be in the form of downwardly facing spaced angle irons, attached to the walls of the upper housing 26. The vapor caps 84 serve the purposes of directing the liquid out of the riser pipes down into the upper chamber 14 while allowing the boiled off water vapors to escape through the vapor outlet port 32 at the top of the vessel 12.

The reboiler system 10 may also include desiccant preheating apparatus 86 which comprises a heated-lean-desiccant chamber 88 having inlet port 90 operably connected to the outlet port 45 of the reboiler drum by means of suitable piping 92. The vessel 88 also has an oppositely disposed outlet port 94 operably connected to the inlet port 56 of the surge tank 24 by means of suitable piping 96. The water-rich-desiccant is piped into the heat exchanger vessel 88 by means of suitable piping 98 and is routed through the interior of the vessel 88 by helical coil 100 or the like for providing greater surface contact with the hot-lean-desiccant located therein. The heated water-rich-desiccant is then transmitted by suitable piping 102 into the inlet port 34 at the upper end of the reboiler vessel 12.

In operation, water-rich-desiccant is preheated by way of the heat exchanger means 86 and introduced into the reboiler vessel through the port 34. The water-rich-desiccant then falls into the splash receiving tray 36 in the upper reboiler chamber 14 whereby any water vapors that are dislodged thereby may escape through the vapor outlet port 32. The rich desiccant is then transferred from the tray 36, by means of the downcomer 42, into the lower reboiler chamber 16. When this chamber reaches capacity, the liquid desiccant moves up through the risers 82 and is heated within the risers by means of the hot exhaust gases that are being passed through the heating chamber 18. The desiccant then is diverted by the vapor caps 84 into the lower part of the upper reboiler 14 where it is allowed to recirculate back through the lower reboiler chamber 16 by means of a plurality of downcomer pipes 48.

This recirculation continues until the liquid level in the upper reboiler reaches the outlet port 45. By this time a major portion of the water carried by the desiccant has been boiled off and the vapors thereof allowed to escape through the vapor outlet port 32. The upper leanest portion of the desiccant is then allowed to flow out of the outlet 45 and is transmitted via the pipe 92 into the heat exchanger vessel 88. The lean-desiccant is then transferred, via the pipe 96, into the surge chamber 24 of the reboiler vessel where it is contained until being removed for use via the drain outlet 58.

From the foregoing, it is obvious that the invention described herein provides a vertically oriented flameless reboiler which is capable of receiving rich-desiccant in the central upper end thereof for processing by the flameless reboiler for the purpose of removing water entrained by the desiccant.

Whereas, the present invention has been described in particular relation to the drawings attached hereto it is obvious that other and further modifications, apart from those shown or suggested herein, may be made within the spirt and scope of the invention.

What is claimed:

1. A vertical reboiler for reconcentrating liquid desiccant through utilization of exhaust gas from a prime mover comprising:
   a. an elongated vertically disposed enclosed vessel having an upper enclosed reboiler chamber, a lower enclosed reboiler chamber and an enclosed heating chamber interposed therebetween.
   b. said upper chamber having centrally disposed water-rich-desiccant inlet means at the upper end thereof, a first outlet for disengaged water vapors also centrally disposed at the upper end thereof, water-rich-desiccant receiving tray disposed below the inlet means and above the liquid desiccant contained in the upper chamber, first downcomer means disposed outside the housing, the ends thereof being in open communication with the receiving tray and the lower chamber, second outlet spaced below the receiving tray for removing heated water-lean-desiccant, second downcomer means disposed outside of the housing connecting the lower portion of the upper chambers to the lower chamber for recirculation of the dessicant.
   c. a plurality of spaced apart open-ended riser conduits vertically disposed and carried by the heating section, the lower ends thereof in communication with the upper portion of the lower chamber and the upper ends extending into the upper drum above the said second outlet.
   d. said heating chamber enveloping the lower portion of said riser conduits for convection heating of the desiccant within the risers, and having exhaust gas inlet means on one side thereof and oppositely disposed exhaust gas outlet means.

2. A vertical reboiler as set forth in claim 1 and including heat exchanger means operably connected to said second outlet and the water-rich-desiccant inlet means for preheating the water-rich-desiccant from the heated water-lean-desiccant by convection.

3. A vertical reboiler as set forth in claim 1 and including an enclosed water-lean-desiccant surge compartment within the housing below the lower reboiler chamber operably connected to said second outlet for receiving lean-desiccant, and outlet port at the bottom of said surge compartment for removing said lean-desiccant.

4. A vertical reboiler as set forth in claim 1 and including vapor cap means disposed within the upper reboiler chamber directly over the upper ends of the risers for directing the liquid desiccant down into the lower portion of the upper reboiler chamber and dislodging vapor therefrom.

5. A vertical reboiler as set forth in claim 1 and including means carried by the housing for removing the upper reboiler chamber from the heating chamber and for removing heating chamber from the lower reboiler chamber.

6. A vertical reboiler as set forth in claim 1 wherein the vessel includes vertical expansion joint means for heat change compensation.

* * * * *